Patented Oct. 16, 1945

2,386,855

UNITED STATES PATENT OFFICE 2,386,855

MATERIALS IMPERMEABLE TO ULTRA-VIOLET LIGHT

William Horback, Newark, N. J., assignor to Celanese Corporation of America, a corporation of Delaware No Drawing. Application June 23, 1942, Serial No. 448,184

3 Claims. (Cl. 252—301.2)

This invention relates to the manufacture of materials which are opaque or substantially opaque to ultra-violet light radiations, i. e. radiations from 4,000 A. U. (Angstrom units) to at least 2,700 A. U. or shorter.

Films, foils, sheets and similar materials which are opaque to ultra-violet light radiations are of value for many purposes, such as photographic filters and films, as coverings for food, especially those containing oxidizable fats, as protections for printed matter to preserve the life of the document, as interlayers for laminated or coated glass, as lenses in gas masks, welders' goggles and aviators' goggles, and, in fact, wherever ultra-violet light absorbers are needed.

Ultra-violet light radiations. even in the amount present in normal sun light, is injurious to the eye and government specifications thus require goggle lenses for welders, tank corps, aviation, mechanized troops, etc., to be fabricated of a material impermeable to these short wave lengths or actinic rays. These actinic rays also hasten to turn rancid foodstuffs containing fats and oils, and therefore, wrappers and/or covers for same should absorb these radiations. Actinic rays also effect the fading of merchandise displayed in store windows unless protected therefrom by an untra-violet light absorbing film or coating on the glass window or by suitably covering the merchandise. Merchandise in display windows may be protected by transparent drapes or curtains with printed borders or otherwise decorated when the drapes are made of an ultra-violet light absorbing film or foil. Obviously, there are many other uses for ultra-violet light absorbers such as in photography, laminated glass for trucks, airplanes and mechanized equipment, especially those intended for operation in the tropics where the ultra-violet portion of the sun's rays effect a discoloration and a break-down of plastic materials employed in building shatter-proof glass, unbreakable windows, sun shades, visors, gas masks, etc. Another important use of transparent sheet material that is an absorber of ultra-violet light is in shields protecting workmen in industries that require mercury-arc lamps and converters or other industrial appliances that emit ultra-violet radiations.

Various dyestuffs, when used in sufficient concentration, absorb ultra-violet light radiations satisfactorily. However, they also effect the transmission of the visible part of the spectrum by virtue of the fact that they strongly color the plastic base material to which they are added. Accordingly, such materials are generally objectionable. The ideal ultra-violet light absorber should transmit substantially 100% at wave lengths from 7,200 A. U. to 4,000 A. U. and should transmit substantially no wave lengths from 4,000 A. U. to at least 2,700 A. U., below which most plastics normally absorb. This property is possessed by plastics produced in accordance with this invention, especially those formed from organic esters and ethers of cellulose containing fluoranthene compounds.

Another important property possessed by ultra-violet light absorbers produced in accordance with this invention is their ability to withstand exposure to light and heat without an appreciable change in their transmission characteristics in either the visible part of the spectrum or in the ultra-violet part. In other words, the ultra-violet light absorbers of this invention do not lose their ultra-violet light absorbing properties upon exposure to sun light or other strong light. Moreover, when plasticizers such as those referred to in U. S. Patent No. 1,931,518 to J. F. Walsh, that possess good ultra-violet light transmission effects are employed, these effects may be partially or completely nullified by the addition of fluoranthene compounds.

An advantage of ultra-violet light absorbers of the present invention is that they are relatively inexpensive, compared with those formerly employed, and they are readily available in this country.

Another advantage of the ultra-violet light absorbers of the present invention is that they are neutral in chemical reaction. They do not decompose, hydrolize or otherwise degrade the cellulose derivative or other base employed. In this respect, they may be used without leading to any serious decomposition or development of brittleness in the final product. Furthermore, fluoranthene compounds exert a plasticizing effect on some plastics, especially the derivatives of cellulose. Hence, larger quantities may be employed with effective results without crystallizing or separating out from the plastic or the coating or lacquer solution when the compound is applied to a surface, say, by a beading, spraying or dipping machine. They also tend to prevent "crazing" of the plastics.

Another important advantage of the present invention is that the plastics may be shaped by injection molding operations as the addition of the ultra-violet light absorbing compound does not break down nor exert a deleterious effect on the plastic base at molding temperatures. This permits the injection molding of lenses for goggles and also for the lenses with the rims integral therewith.

A still further advantage of the present invention is the production of films and foils having an intense fluorescence in ultra-violet light and a novel bluish fluorescence in ordinary light and sun light. This novel effect is of great advantage in store window displays where the film both protects the merchandise and enhances the decoration thereof.

The sheets, films, foils, filaments, molded articles or other articles of the present invention are formed of plastic base materials which are not in themselves opaque to ultra-violet radiations, especially the near ultra-violet radiations (4,000 to 2,700 A. U.) but which are made opaque or substantially opaque thereto by incorporating therein or thereon fluoranthene compounds. The term "fluoranthene compound" includes within its scope fluoranthene ($C_{16}H_{10}$) having a structural formula

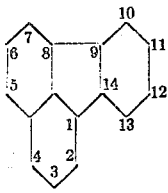

and its alkyl and aryl substitution derivatives. Examples of such derivatives of fluoranthene are 3-methyl fluoranthene, 3-phenyl fluoranthene, 4-methyl fluoranthene, 4-phenyl fluoranthene, 4-methyl dihydro fluoranthene, etc.

The amount of fluoranthene compound employed will depend upon the plastic base employed, its thickness in the finished product, the effect materials, such as dyes, plasticizers, fillers, etc., incorporated therein and also to the degree of impermeability to ultra-violet light desired. Generally, the amount may vary between 0.10 to 5%, based on the weight of the plastic base exclusive of plasticizers, although lesser or greater amounts may be used. For instance, in a clear cellulose acetate film 0.75 part by weight of fluoranthene to 100 parts of cellulose acetate produces stock that in sheets of 0.01 thickness transmits above 90% of the visible spectrum and absorbs more than 95% of the ultra-violet radiations and substantially all of the ultra-violet radiations having a length of 3,650 A. U. or shorter.

As stated above, a fluoranthene compound or mixtures of same may be incorporated in the plastic sheet, film, foil, filament, extruded or molded article or lacquer in amounts of from 0.10 to 5% or more, based on the weight of the plastic base. The fluoranthene compound may be incorporated in the plastic film, foil or filament by adding it to the solution of plastic material in a solvent therefor, with or without plasticizers for the plastic material, from which the film, foil or filament is formed. The fluoranthene compound may be applied as a coating to a preformed film, foil or any article having a plastic base by subbing, brushing or spraying the preformed base with a solution of the fluoranthene compound with or without a carrier therefor. The fluoranthene compound may be incorporated in injection-molding powder and extruded or pressure molded into articles, in which case they aid in stabilizing the dyes while they are under the high temperature and/or pressure of molding and under subsequent exposure to actinic rays.

The fluoranthene compounds being readily compatible with derivatives of cellulose and being plasticizers for some derivatives of cellulose may be incorporated with the plastic base material by adding them at the same time and in the same operation that solvents or plasticizers are added to the plastic base material. The fluoranthene compound may be incorporated in the plastic base material by dissolving or suspending the same in a plasticizer and the product used for laminating two films together or laminating a film to one or more sheets of glass. The fluoranthene compound may be incorporated in lacquers containing a plastic film base which lacquers are useful for coating articles such as window glass, bottles, etc. Plastic sheets, film, fabrics or foils containing a fluoranthene compound may be employed as an overlay for protecting light sensitive bases, such as cellulose nitrate and certain resins, to prevent the same from darkening or "crazing" upon exposure to sunlight.

The plastic base is preferably a derivative of cellulose, such as cellulose esters and ethers, but it may also be any other suitable plastic or mixture of plastics. Examples of cellulose derivatives are nitrocellulose, cellulose acetate, cellulose acetobutyrate, cellulose acetate-phthalate, cellulose propionate, methyl cellulose, ethyl cellulose, benzyl cellulose, etc. The plastic base may also be regenerated or reconstituted cellulose or a synthetic resin such as polystyrene, polymerized methyl methacrylate, vinyl or vinal resins, phenol or urea formaldehyde condensation products, such as Bakelite, Catalin, Beetleware, synthetic rubbers such as Pliofilm, Buna-S, etc. Artificial silk fabrics may be made exhibiting a marked opacity to ultra-violet light. Gelatin and agar may also be employed as the base. Light sensitive liquids or solids are rendered more stable by the addition thereto of small amounts of a fluoranthene compound.

An important advantage of this invention is that it is necessary to employ only a relatively small amount of fluoranthene and/or its derivative to obtain the effect desired. The small amounts employed do not interfere with the dyestuffs which are generally added to films, foils or molded articles to control the transmission characteristics of the visible portion of the spectrum, such as the dyes used to balance the natural yellow or brown cast of plastics, the grey dye used in welders' goggles, etc.

It is to be understood that the foregoing detailed description is merely given by way of illustration and that many variations may be made therein without departing from the spirit of my invention.

Having described my invention, what I desire to secure by Letters Patent is:

1. Articles transparent to visible light characterized by being substantially opaque to ultra-violet light radiations and exhibiting a bluish fluorescence under ultra-violet light, said articles consisting essentially of a plastic cellulose derivative material having incorporated therewith from 0.10 to 5% on the weight of the cellulose derivative material of a compound selected from the group consisting of fluoranthene and the alkyl and aryl substitution derivatives thereof.

2. Articles transparent to visible light characterized by being substantially opaque to ultra-violet light radiations and exhibiting a bluish fluorescence under ultra-violet light, said articles consisting essentially of a plastic cellulose acetate material having incorporated therewith from 0.10 to 5% on the weight of the cellulose acetate material of a compound of the group consisting of fluoranthene and the alkyl and aryl substitution derivatives thereof.

3. Articles transparent to visible light characterized by being substantially opaque to ultra-violet light radiations and exhibiting a bluish fluorescence under ultra-violet light, said articles consisting essentially of a plastic cellulose acetate material having incorporated therewith 0.75% on the weight of the cellulose acetate material of fluoranthene.

WILLIAM HORBACK.